(12) United States Patent
Cao

(10) Patent No.: US 8,307,508 B2
(45) Date of Patent: Nov. 13, 2012

(54) HINGE ASSEMBLY FOR PORTABLE ELECTRONIC DEVICES

(75) Inventor: Jin-Ti Cao, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 380 days.

(21) Appl. No.: 12/424,828

(22) Filed: Apr. 16, 2009

(65) Prior Publication Data

US 2010/0122432 A1 May 20, 2010

(30) Foreign Application Priority Data

Nov. 20, 2008 (CN) .......................... 2008 1 0305666

(51) Int. Cl.
*E05C 17/64* (2006.01)

(52) U.S. Cl. .................. 16/342; 16/297; 16/337; 16/334

(58) Field of Classification Search .................... 16/277, 16/297, 319, 337, 341, 342, 376, 377, 321, 16/334, 335, 336, 308
See application file for complete search history.

(56) References Cited

U.S. PATENT DOCUMENTS

| 3,388,420 | A  * | 6/1968 | Ballantyne ..................... 16/225 |
| 5,276,945 | A  * | 1/1994 | Matsumura .................... 16/337 |
| 5,317,785 | A  * | 6/1994 | Kobayashi ..................... 16/329 |
| 6,711,781 | B2 * | 3/2004 | Hsiu ............................... 16/342 |
| 6,817,061 | B2 * | 11/2004 | Wu et al. ........................ 16/308 |
| 2004/0020013 | A1 | 2/2004 | Wu et al. |
| 2007/0214605 | A1 * | 9/2007 | Tu .................................. 16/342 |
| 2009/0000061 | A1 * | 1/2009 | Lin et al. ........................ 16/319 |

* cited by examiner

*Primary Examiner* — Jeffrey O Brien
(74) *Attorney, Agent, or Firm* — Altis Law Group, Inc.

(57) ABSTRACT

A hinge assembly for pivotably coupling a cover section and a body section comprise a first coupling element, a second coupling element including a first latching block and a second latching block spaced from the first latching block, the first latching block and the second latching block being configured for latching with the cover section, and an elastic element. One end of an elastic element is fixed to the first coupling element, another end of the elastic element is fixed to the second coupling element.

17 Claims, 5 Drawing Sheets

HINGE ASSEMBLY FOR PORTABLE ELECTRONIC DEVICES

BACKGROUND

1. Technical Field

The present invention relates to hinge assemblies and, particularly, to an automatically opening hinge assembly for foldable devices such as portable telephones, portable computers, and etc.

2. Description of Related Art

At present, one of the most popular portable electronic device in the marketplace is the foldable cellular telephone, which generally includes a cover section and a body section. The cover section and the body section are rotatably interconnected through a hinge assembly, for changing the portable electronic device between open and closed positions.

One kind of hinge assembly employs a cam and a spring-loaded follower, which allows the cover section to fold outwardly from the body section and then be held in an open position. However, these types of hinge assemblies require a significant amount of components and the structure of the hinge assembly is complex.

Therefore, there is a room for improvement within the art.

BRIEF DESCRIPTION OF THE DRAWINGS

Many aspects of the hinge assembly can be better understood with reference to the following drawings. The components in the drawings are not necessarily to scale, the emphasis instead being placed upon clearly illustrating the principles of the present hinge assembly. Moreover, in the drawings, like reference numerals designate corresponding parts throughout the several views, in which.

DETAILED DESCRIPTION OF THE EMBODIMENTS

Figure 1:
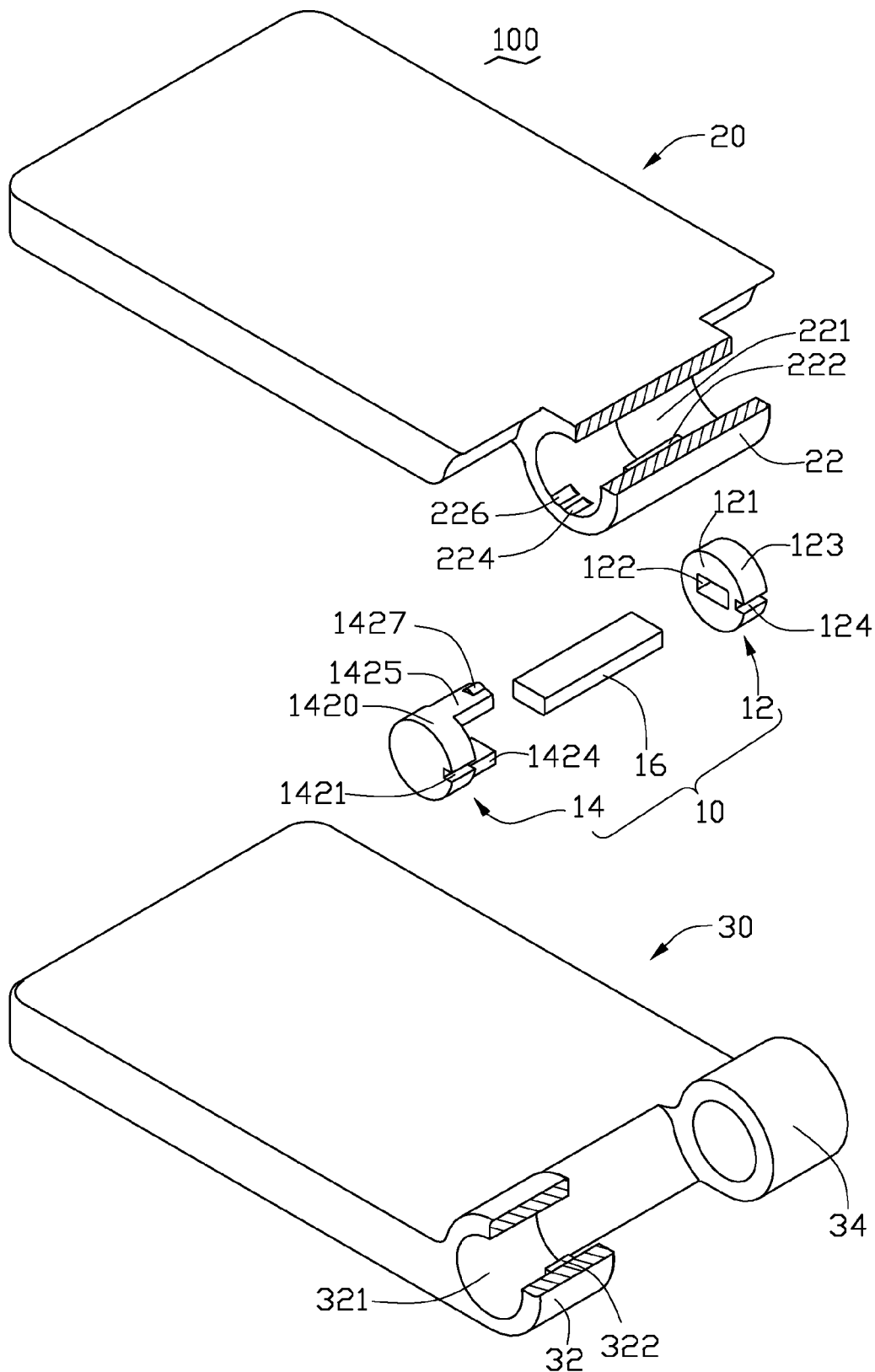
FIG. 1 is an exploded and partially cutaway view of a portable electronic device with a hinge assembly in according with an exemplary embodiment.
Figure 2:
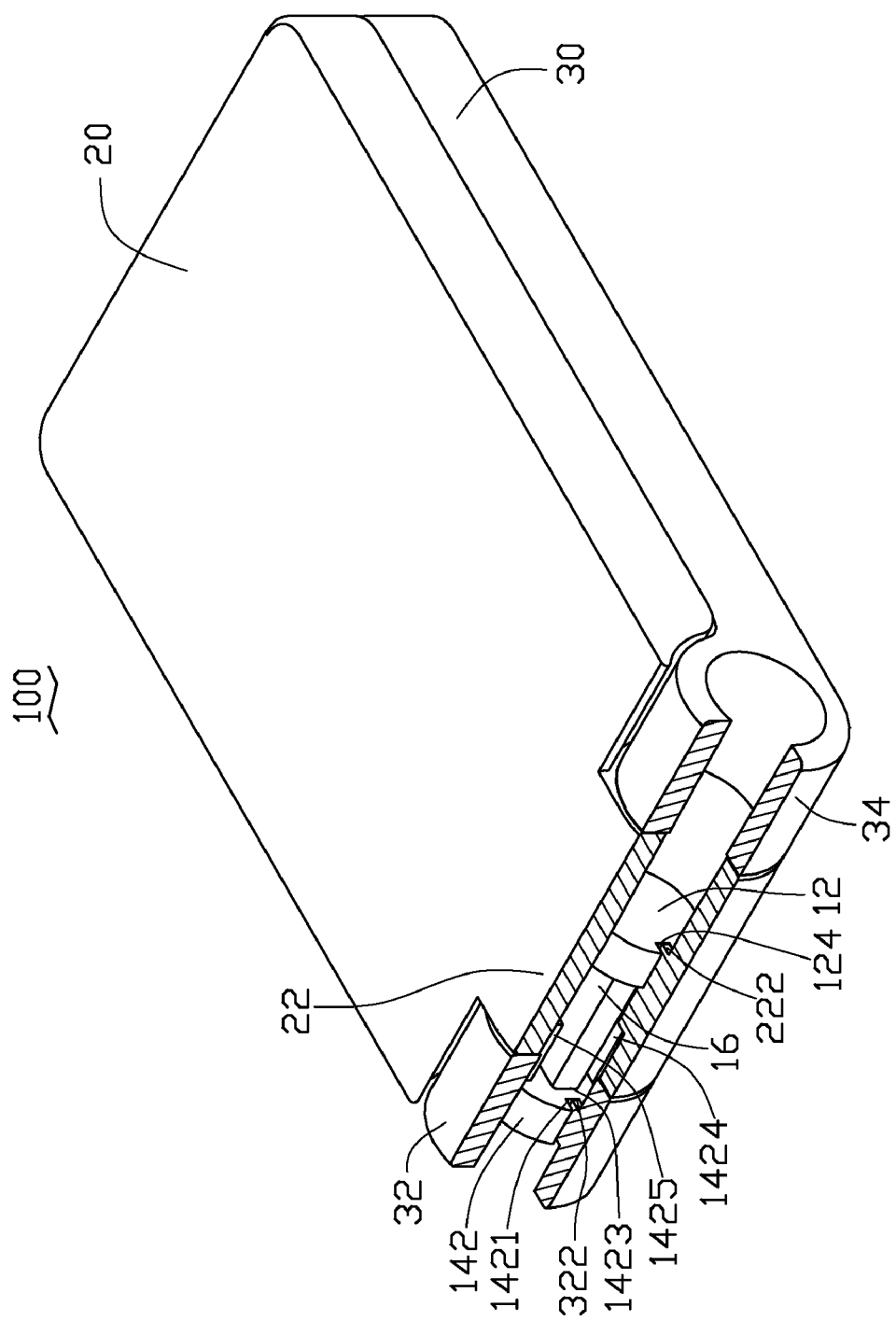
FIG. 2 is an assembled and partially cutaway view of the portable electronic device shown in FIG. 1.

Referring now to the drawings, FIGS. 1 and 2, show a hinge assembly 10, applied to a foldable electronic device 100 such as a flip type mobile phone, which includes a cover section 20 and a body section 30 pivotably coupling with the cover section through the hinge assembly 10. It is to be understood that, the hinge assembly 10 could be advantageously used in other environments (e.g. cabinet doors).

The hinge assembly 10 in the exemplary embodiment includes a first coupling element 12, a second coupling element 14, and a columnar elastic element 16 configured for connecting the first coupling element 12 and the second coupling element 14. The elastic element 16 provides an elastic restoring force to make the first coupling element 12 rotate relative to the second coupling element 14.

The first coupling element 12 is substantially cylindrical, including a first end surface 121 facing the second coupling element 14, and a peripheral wall 123. The first coupling element 12 defines a first hole 122 in the first end surface 121, for accommodating one end of the elastic element 16. The first coupling element 12 defines a first groove 124 in the peripheral wall 123. The first groove 124 is configured to engage with the cover section 20 of the mobile phone 100 so that the first coupling element 12 and the cover section 20 cannot rotate relative to each other.

Figure 3:
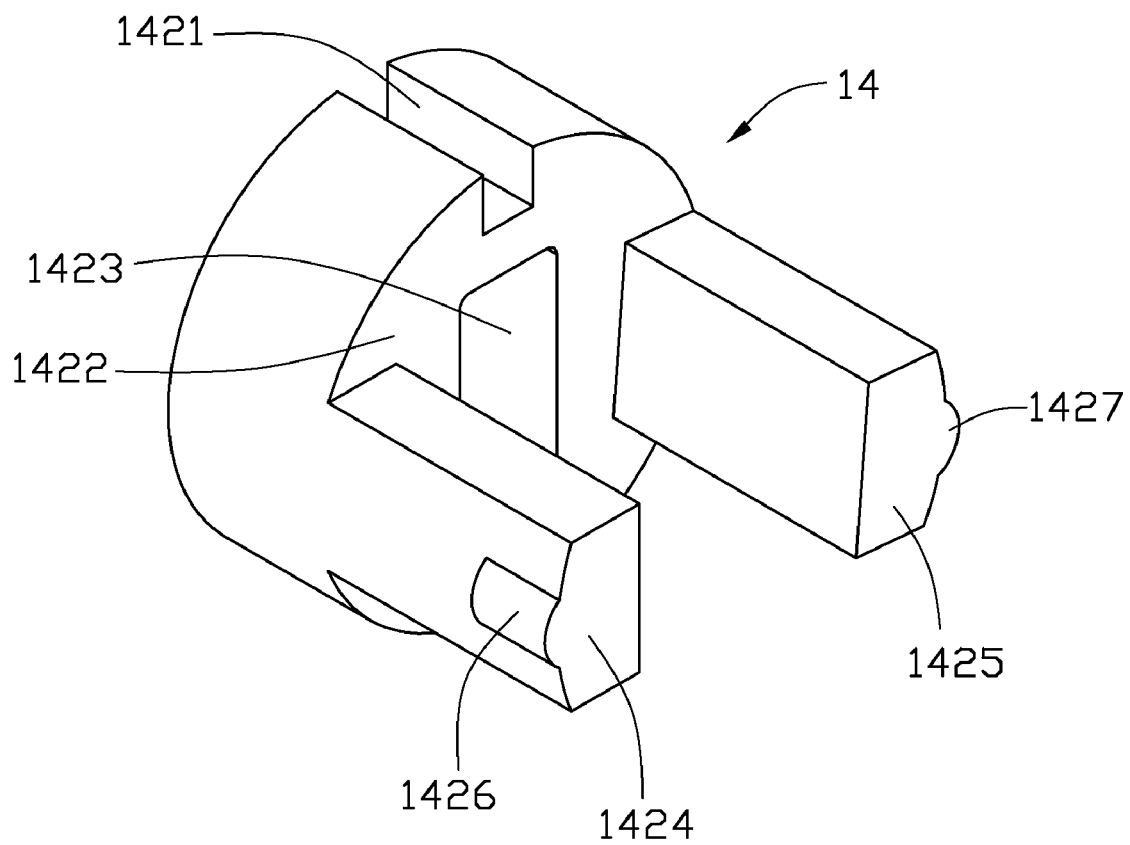
FIG. 3 is an enlarged view of the second coupling element shown in FIG. 1.
Figure 4:
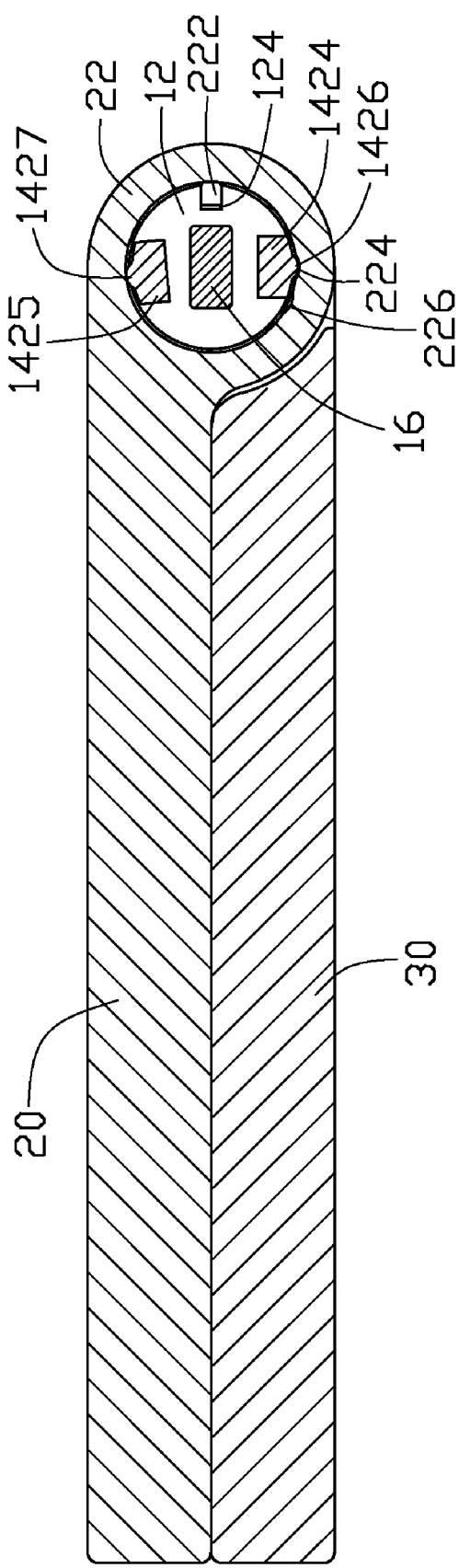
FIG. 4 is a cross sectional view of the portable electronic device shown in FIG. 2 in a closed position.

Referring to FIG. 3, the second coupling element 14 is substantially cylindrical, and has a peripheral wall 1420. The peripheral wall 1420 defines a second groove 1421 for engaging with the body section 30 such that the second coupling element 14 is non-rotatably mounted to the body section 30. The second coupling element 14 has a second end surface 1422 facing the first coupling element 12. The second end surface 1422 defines a second hole 1423 at a central area thereof, for accommodating another end of the elastic element 16. The second coupling element 14 has a first connecting block 1424 and a second connecting block 1425 both protruding from the second end surface 1422. The first connecting block 1424 and the second connecting block 1425 are symmetrically located at opposite sides of the second hole 1423. The first connecting block 1424 and the second connecting block 1425 are used for connecting the cover section 20 and the body section 30 together. The first connecting block 1424 has a first latching block 1426 formed at a distal end away from the second end surface 1422 and on one side thereof facing away from the second connecting block 1425. The second connecting block 1425 has a second latching block 1427 formed at a distal end away from the second end surface 1422 on one side thereof facing away from the first connecting block 1424.

The cover section 20 has a first sleeve 22 protruding from one end thereof. The first sleeve 22 is a substantially hollow cylinder, and has an inner wall 221. The inner wall 221 has a first sleeve block 222 protruding therefrom and corresponding to the first groove 124. The first sleeve block 222 may engage with the first groove 124 of the first coupling element 12 so that the first coupling element 12 and the cover section 20 cannot rotate relative to each other. The inner wall 221 has a first trough 224 and a second trough 226 located parallel to and apart from each other. The first trough 224 is used for latching with the first latching block 1426, the second trough 226 is used for latching with the second latching block 1427.

The body section 30 has a second sleeve 32 and a third sleeve 34 apart from the second sleeve 32, both of which protruding from one end of the body section 30. The second sleeve 32 may pivotably couple with the first sleeve 22 by one hinge assembly 10, the third sleeve 34 may pivotably couple with the first sleeve 22 by another hinge assembly 10 (not shown).

The second sleeve 32 is a substantially hollow cylinder, and has an inner wall 321. The inner wall 321 has a second sleeve block 322 protruding therefrom and corresponding to the second groove 1421. The second sleeve block 322 may engage with the second groove 1421 of the second coupling element 14 so that the second coupling element 14 and the body section 30 cannot rotate relative to each other.

In assembly, one end of the elastic element 16 is inserted into and fixed (e.g., holt melt) within the first hole 122 of the first coupling element 12, another end of the elastic element 16 is inserted into and fixed (e.g., hot melt) within the second hole 1423 of the second coupling element 14, so the first coupling element 12, the second coupling element 14, and the elastic element 16 are assembled together. After that, the cover section 20 is assembled onto the body section 30. At this time, the first sleeve 22 is positioned between the second sleeve 32 and the third sleeve 34, and aligned to the second sleeve 32 and the third sleeve 34. Then, the first coupling element 12 is passed through the second sleeve 32 until it enters into the first sleeve 22. At this stage, the first sleeve block 222 of the cover section 20 is engaged in the first groove 124 of the first coupling element 12 so that the first sleeve 22 cannot rotate relative to the first coupling element 12. The second sleeve block 322 of the body section 30 is engaged in the second groove 1421 of the second coupling element 14 so that the second sleeve 32 cannot rotate relative to the second coupling element 14. The first connecting block 1424 and the second connecting block 1425 are inserted into the first sleeve 22 and tightly resist against the inner wall 221 of the first sleeve 22, thus the cover section 20 and the body section 30 are assembled by the hinge assembly 10. Additionally, the first latching block 1426 of the first connecting block 1424 is latched within the first trough 224, so that the cover section 20 cannot rotate relative to the body section 30, i.e., the portable electronic device 100 is in closed position.

Figure 5:
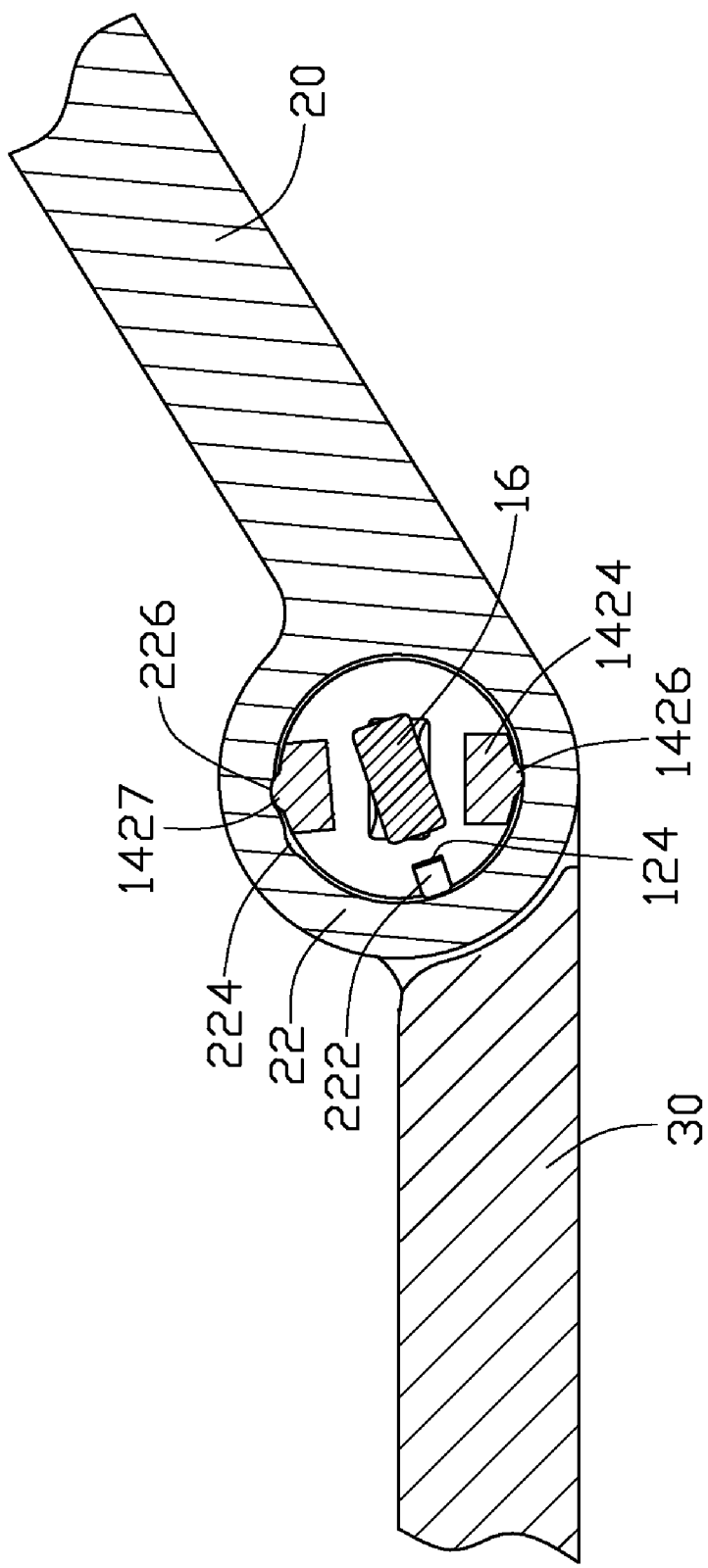
FIG. 5 is a cross sectional view of the portable electronic device shown in FIG. 2 in an opened status.

When opening the cover section 20 of the portable electronic device 100, a force is exerted on the cover section 20 to make the cover section 20 rotate relative to the body section 30, thus driving the first sleeve 22 to rotate relative to the second sleeve 32. As mentioned above, the first sleeve 22 is engaged with the first coupling element 12, the second sleeve 32 is engaged with the second coupling element 14, and the first coupling element 12 rotates relative to the second coupling element 14 until the cover section 20 reaches an open position (seen FIG. 5), at this time, the second latching block 1427 is latched within the second trough 226 of the first sleeve 22 to stably secure the cover section 20 in the opened position. Additionally, the elastic element 16 accumulates an elastic restoring force.

When closing the cover section 20, the cover section 20 is rotated in a direction towards the body section 30, in this process, the second latching block 1427 releases outwardly from the second trough 226. At that time, the cover section 20 continuously rotate towards the body section 30 by the elastic restoring force of the elastic element 16, until the first latching block 1426 of the first connecting block 1424 is latched within the first trough 224 again, as such, the portable electronic device 100 is in a closed position.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge assembly for pivotably coupling a cover section and a body section, comprising:
    a first coupling element;
    a second coupling element including a first connecting block and a second connecting block, the first connecting block having a first latching block and the second connecting block having a second latching block spaced from the first latching block, the first latching block and the second latching block being configured for directly latching with the cover section; and
    an elastic element being a rectangular block, a first end of the elastic element being fixed to the first coupling element, a second end of the elastic element being fixed to the second coupling element, the first connecting block and the second connecting block spaced from the second end of the elastic element;
    wherein when the first coupling element rotates relative to the second coupling element, the elastic element accumulates an elastic restoring force, whereby the first coupling element reversely rotates relative to the second coupling element by the elastic restoring force.

2. The hinge assembly as claimed in claim 1, wherein the first coupling element defines a first hole for accommodating and fixing the first end of the elastic element therein, the second coupling element defines a second hole for accommodating and fixing the second end of the elastic element therein.

3. The hinge assembly as claimed in claim 2, wherein the first coupling element has a first end surface facing the second coupling element, the first hole is defined in the first end surface, the second coupling element has a second end surface facing the first coupling element, and a peripheral wall, the second hole defined in the second end surface.

4. The hinge assembly as claimed in claim 3, wherein the first connecting block protrudes from the second end surface and is located at one side of the second hole, and the second connecting block protrudes from the second end surface and is located at an opposite side of the second hole, the first connecting block and the second connecting block are aligned with the peripheral wall of the second coupling element and used for connecting the cover section and the body section together.

5. The hinge assembly as claimed in claim 4, wherein the first connecting block forms the first latching block on one side thereof facing away from the second connecting block, the second connecting block forms the second latching block on one side thereof facing away from the first connecting block.

6. A foldable electronic device having a body section and a cover section hinged together by a hinge assembly, the hinge assembly comprising:
    a first coupling element;
    a second coupling element including a first connecting block and a second connecting block, the first connecting block having a first latching block and the second connecting block having a second latching block spaced from the first latching block, the first latching block and the second latching block directly and successively latch with the cover section to hold the cover section in a closed position or an open position; and
    an elastic element being a rectangular block, a first end of the elastic element being fixed to the first coupling element, a second end of the elastic element being fixed to the second coupling element, the first connecting block and the second connecting block spaced from the second end of the elastic element;
    wherein when the first coupling element rotates relative to the second coupling element, the elastic element accumulates elastic restoring force, whereby the first coupling element reversely rotates relative to the second coupling element by the elastic restoring force.

7. The foldable electronic device as claimed in claim 6, wherein the first coupling element defines a first hole for accommodating and fixing the first end of the elastic element therein, the second coupling element defines a second hole for accommodating and fixing the second end of the elastic element therein.

8. The foldable electronic device as claimed in claim 7, wherein the first coupling element has a first end surface facing the second coupling element, the first hole is defined in the first end surface.

9. The foldable electronic device as claimed in claim 7, wherein the second coupling element has a second end surface facing the first coupling element and a peripheral wall, the second hole is defined in the second end surface.

10. The foldable electronic device as claimed in claim 9, wherein the first connecting block protrudes from the second end surface and is located at one side of the second hole, and the second connecting block protrudes from the second end surface and is located at an opposite side of the second hole, the first connecting block and the second connecting block are aligned with the peripheral wall of the second coupling element and used for connecting the cover section and the body section together.

11. The foldable electronic device as claimed in claim 10, wherein the first connecting block forms the first latching block on one side thereof facing away from the second connecting block, the second connecting block forms the second latching block on one side thereof facing away from the first connecting block.

12. The foldable electronic device as claimed in claim 6, wherein the first coupling element defines a first groove in a peripheral wall thereof, the cover section has a first sleeve protruding from one end thereof, the first sleeve has a first sleeve block engaging with the first groove so that the first coupling element and the cover section cannot rotate relative to each other.

13. The foldable electronic device as claimed in claim 12, wherein the first sleeve is a substantially hollow cylinder, and has an inner wall, the first sleeve block is protruded from the inner wall.

14. The foldable electronic device as claimed in claim 13, wherein the inner wall has a first trough and a second trough spaced from the first trough, the first trough is used for latching with the first latching block, the second trough is used for latching with the second latching block.

15. The foldable electronic device as claimed in claim 6, wherein the second coupling element defines a second groove in a peripheral wall thereof, the body section has a second sleeve, the second sleeve has a second sleeve block engaging with the second groove so that the second coupling element and the body section cannot rotate relative to each other.

16. The foldable electronic device as claimed in claim 15, wherein the second sleeve is a substantially hollow cylinder, and has an inner wall, the second sleeve block is protruded from the inner wall.

17. A foldable electronic device comprising:
a cover section including a first sleeve protruding from one end thereof, the first sleeve defining a first trough and a second trough located parallel to and apart from each other; a body section including a second sleeve protruding from one end thereof;
a hinge assembly hinging the body section and the cover section together, the hinge assembly comprising:
a first coupling element;
a second coupling element including a main body, a first connecting block and a second connecting block, the first connecting block having a first latching block and the second connecting block having a second latching block spaced from the first latching block; and
an elastic element being a rectangular block, a first end of the elastic element being fixed to the first coupling element, a second end of the elastic element being fixed to the second coupling element, the first connecting block and the second connecting block spaced from the second end of the elastic element;
wherein the first sleeve is aligned with the second sleeve, the first coupling element is received in the first sleeve, the main body of the second coupling element is received in the second sleeve, and the first connecting block and the second connecting block extend into the first sleeve from the second sleeve;
the first latching block is latched in the first trough to hold the cover section in a closed position;
when the first coupling element rotates relative to the second coupling element to allow the first latching block to be moved out of the first trough, the elastic element accumulates elastic restoring force until the second latching block is latched in the second trough to hold the cover section in an open position;
when the first coupling element reversely rotates relative to the second coupling element to allow the second latching block to be moved from the second trough, the first coupling element automatically rotates relative to the second coupling element by the elastic restoring force until the first latching block is received in the first trough again.

* * * * *